US011007845B2

(12) United States Patent
Pinger (10) Patent No.: US 11,007,845 B2
(45) Date of Patent: May 18, 2021

(54) DOOR FIXATION BOSS (71) Applicants: DENSO International America, Inc., Southfield, MI (US); DENSO CORPORATION, Kariya (JP)

(72) Inventor: Michael Pinger, Clawson, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 104 days.

(21) Appl. No.: 16/266,466

(22) Filed: Feb. 4, 2019

(65) Prior Publication Data
US 2019/0241042 A1    Aug. 8, 2019

Related U.S. Application Data (60) Provisional application No. 62/627,820, filed on Feb. 8, 2018.

(51) Int. Cl.
*B60H 1/00* (2006.01)
*B60H 1/26* (2006.01)

(52) U.S. Cl.
CPC ..... *B60H 1/00664* (2013.01); *B60H 1/00021* (2013.01); *B60H 1/00528* (2013.01); *B60H 1/00842* (2013.01); *B60H 1/26* (2013.01); *B60H 2001/002* (2013.01)

(58) Field of Classification Search
CPC ............ B60H 1/00664; B60H 1/00521; B60H 2001/007; B60H 2001/00707; B60H 2001/00078; B60H 2001/00092; B60H 2001/00242; F16K 35/02

USPC ......................................................... 137/316
See application file for complete search history.

(56) References Cited

U.S. PATENT DOCUMENTS

| 1,853,659 | A | | 4/1932 | Briskin |
| 3,570,539 | A | * | 3/1971 | Herring ................. B65G 47/72 |
| | | | | 137/625.44 |
| 4,582,252 | A | | 4/1986 | Ogihara et al. |
| 4,807,665 | A | * | 2/1989 | Schiel ................. F16K 11/0525 |
| | | | | 137/625.4 |
| 5,551,667 | A | | 9/1996 | Galka et al. |
| 5,775,407 | A | | 7/1998 | Inoue |
| 5,873,780 | A | | 2/1999 | Mon et al. |
| 6,015,340 | A | | 1/2000 | Scoccia |
| 2002/0024037 | A1 | | 2/2002 | Wakamatu et al. |
| 2002/0070216 | A1 | | 6/2002 | Ueno et al. |
| 2003/0013404 | A1 | | 1/2003 | Uemura et al. |
| 2004/0145881 | A1 | | 7/2004 | Kosugi |
| 2005/0066818 | A1 | | 3/2005 | Kim |
| 2005/0250434 | A1 | | 11/2005 | Kim |
| 2007/0000640 | A1 | | 1/2007 | Fuhrmann et al. |

(Continued)

FOREIGN PATENT DOCUMENTS

| KR | 101528579 B1 | 6/2015 |
| WO | WO-2014092077 A1 | 6/2014 |

*Primary Examiner* — Michael R Reid (57) ABSTRACT

A heating, ventilation, and air-conditioning system for a vehicle includes a housing, a door supported by the housing, and a lock integral with the housing. The housing further includes a first air flow path and a second air flow path. The door moves between a first position blocking airflow from the first air flow path and a second position blocking airflow from the second air flow path. The lock is configured to automatically lock the door in the second position upon assembly of the housing.

20 Claims, 6 Drawing Sheets (56) References Cited

U.S. PATENT DOCUMENTS

2007/0181295 A1    8/2007   Masatsugu
2012/0214389 A1    8/2012   Sekretta et al.
2018/0029441 A1    2/2018   Nakanishi

* cited by examiner

DOOR FIXATION BOSS

CROSS-REFERENCE TO RELATED APPLICATION

This application claims the benefit of U.S. Provisional Application No. 62/627,820 filed on Feb. 8, 2018, the entire disclosure of which is incorporated herein by reference.

FIELD

The present disclosure relates to heating, ventilation, and air-conditioning units, and particularly to a dedicated door control to block or allow air passage through a housing.

BACKGROUND

This section provides background information related to the present disclosure which is not necessarily prior art.

Heating, ventilation, and air-conditioning (HVAC) systems in vehicles, typically include an HVAC case or housing containing a heater core for heating airflow, and often including an evaporator for cooling airflow. The HVAC housing further includes a plurality of airflow control doors that are movable to open and close outlets through which airflow is routed through, and exits, the HVAC housing. For example, a housing may transport heated, mixed, or cooled air from the HVAC system in a front compartment of the vehicle to rear passenger outlets. The housing may route the air though various portions of the vehicle including, for example, the doors. However, when the features of various HVAC systems differ, for example systems providing rear heat/air-conditioning versus systems only having front heat/air-conditioning, different duct or housing systems are necessary. Having multiple options for duct or housing systems increases costs and complexity in manufacturing/assembly.

SUMMARY

This section provides a general summary of the disclosure, and is not a comprehensive disclosure of its full scope or all of its features.

An example embodiment of a heating, ventilation, and air-conditioning system for a vehicle according to the present disclosure includes a housing, a door supported by the housing, and a lock integral with the housing. The housing further includes a first air flow path and a second air flow path. The door moves between a first position blocking airflow from the first air flow path and a second position blocking airflow from the second air flow path. The lock is configured to automatically lock the door in the second position upon assembly of the housing.

In some example embodiments, the door may be fixed on a shaft for rotation within the housing, and the lock may include an aperture for receiving the shaft and rotationally fixing the shaft within the aperture.

In some example embodiments, the aperture may be a T-shaped aperture and the shaft may be a T-shaped shaft.

In some example embodiments, an inner wall of the aperture may include a chamfered step that engages a chamfered step of the shaft.

In some example embodiments, the chamfered step on the inner wall of the aperture may include a sloped edge.

In some example embodiments, an angle of the sloped edge relative to an insertion direction of the shaft may be 45 degrees.

In some example embodiments, the inner wall of the aperture may include a first chamfered step, a second chamfered step, and a third chamfered step to define a T-shape of the aperture.

In some example embodiments, each of the first chamfered step, the second chamfered step, and the third chamfered step may include a sloped edge.

In some example embodiments, an angle of the sloped edge for each of the first chamfered step, the second chamfered step, and the third chamfered step relative to an insertion direction of the shaft may be 45 degrees.

In some example embodiments, upon insertion of the shaft into the aperture, the engagement of the chamfered step of the shaft with the chamfered step of the inner wall may rotate the shaft to position and retain the door in the second position.

In some example embodiments, the first air flow path may be a cold air flow path and the second air flow path may be a hot air flow path.

An example embodiment of a housing for a heating, ventilation, and air-conditioning system according to the present disclosure includes sidewalls, a door supported by the sidewalls, and a lock integral with the sidewalls. The sidewalls define a first air flow path and a second air flow path. The door moves between a first position blocking airflow from the first air flow path and a second position blocking airflow from the second air flow path. The lock is configured to automatically lock the door in the second position upon assembly of the housing.

In some example embodiments, the door may be fixed on a shaft for rotation relative to the sidewalls, and the lock may include an aperture for receiving the shaft and rotationally fixing the shaft within the aperture.

In some example embodiments, the aperture may be a T-shaped aperture and the shaft may be a T-shaped shaft.

In some example embodiments, an inner wall of the aperture may include a chamfered step that engages a chamfered step of the shaft.

In some example embodiments, the chamfered step on the inner wall of the aperture may include a sloped edge.

In some example embodiments, an inner wall of the aperture may include a first chamfered step, a second chamfered step, and a third chamfered step to define a T-shape of the aperture.

In some example embodiments, each of the first chamfered step, the second chamfered step, and the third chamfered step may include a sloped edge.

In some example embodiments, upon insertion of the shaft into the aperture, the engagement of the chamfered step of the shaft with the chamfered step of the inner wall may rotate the shaft to position and may retain the door in the second position.

In some example embodiments, the first air flow path may be a cold air flow path and the second air flow path may be a hot air flow path.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Heating, ventilation, and air-conditioning (HVAC) systems commonly use housing or ducts to transport air throughout a cooled or heated space. For example, in vehicles, a housing or duct system may transport heated, mixed, or cooled air from the HVAC unit in a front compartment of the vehicle to rear passenger outlets. The housing may route the air though various portions of the vehicle including, for example, the doors. In some applications, the HVAC system may be designed such that a dedicated portion of heated, ambient, or cooled air will mix and be carried to the rear passenger outlet in the housing or duct system. A dedicated door control may be utilized to mix the air during rear HVAC control mode where the housing is designed to allow the door to move freely. Providing a locked rear air mix door may be a cost effective way to block off the rear path for vehicle variations without the rear HVAC variant, reducing part, assembly, and tooling costs.

One example of a locked rear-air-mix door includes a female T-cut on the case at an end of the door shaft hole. The existing rear mode door may then be used to seal the hot air inlet-to-rear path. The female T-cut holds the door in a single position by utilizing the door's male T-cut. The female T-cut is a part of, and integral to, the case and has a shape similar to that of an existing HVAC linkage. The female T-cut further contains features to allow the male T-cut on the door shaft to rotate into the proper position to fit during assembly. The female T-cut orientation is designed to close off the hot path to rear with the door. This design accomplishes a safe, pinch-free assembly, little to no risk for door packing to tear/rip during assembly, ease of install, and accurate, error-proof (poka-yoke) install. Additionally, this example allows the use of the same door on vehicle variants with and without a rear air-flow path, reducing costs and complexity during manufacture and assembly.

The housing is designed such that the inner surfaces of the female T-cut on the door insertion side are chamfered in a circular, or rotational, orientation to allow the door shaft male T-cut to slide into the female T-cut position. The chamfered inner surfaces of the female T-cut twist the door shaft male T-cut into position during assembly of the cases to remove any risk or need to position the door in the female T-cut manually. The female T-cut position forces the door to seal over the hot inlet-to-rear path identical to that of the driver linkage in max cold on the exiting cooled air. Sealing of the door to the rear path is indefinite due to the fixed nature of the female T-cut on the housing. Additionally, this design eliminates the need to create a separate part to hold the door in position, removing costs associated to tooling and sourcing of an extra part and complexity during assembly.

Figure 1:
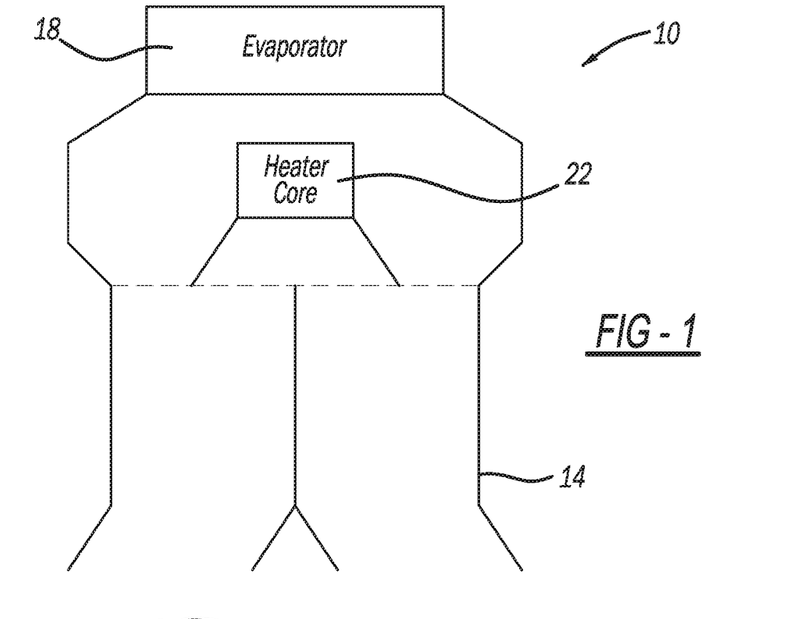
FIG. 1 is an example heating, ventilation, and air-conditioning (HVAC) system according to the present disclosure.

Referring to FIG. 1, a heating, ventilation, and air conditioning (HVAC) system in accordance with the present disclosure at reference numeral 10. The HVAC system 10 may be configured for use with any suitable vehicle, such as any suitable passenger vehicle, commercial vehicle, mass transit vehicle, construction vehicle/equipment, military vehicle/equipment, recreational vehicle, watercraft, etc. The HVAC system 10 may also be configured for use with any suitable non-vehicular application as well.

The HVAC system 10 includes an HVAC housing, duct, or case 14. An evaporator 18 and a heater core 22 are housed within the HVAC housing 14. Although the HVAC system 10 is illustrated and described herein as including the evaporator 18, the evaporator 18 is optional and may not be included in all applications.

The HVAC housing 14 defines a plurality of outlet ducts, through which airflow passes and exits the HVAC housing 14 and flows to various outlets of different zones of the vehicle through any suitable HVAC piping arrangement. An example portion of the housing 26 is illustrated in FIGS. 2 and 3.

Figure 2:
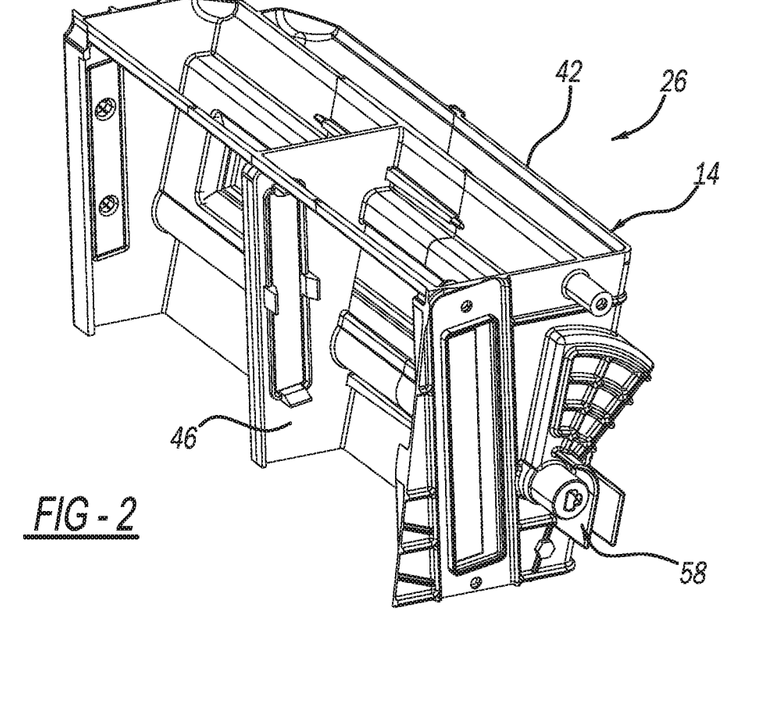
FIG. 2 is an example portion of housing in the HVAC system of FIG. 1.
Figure 3:
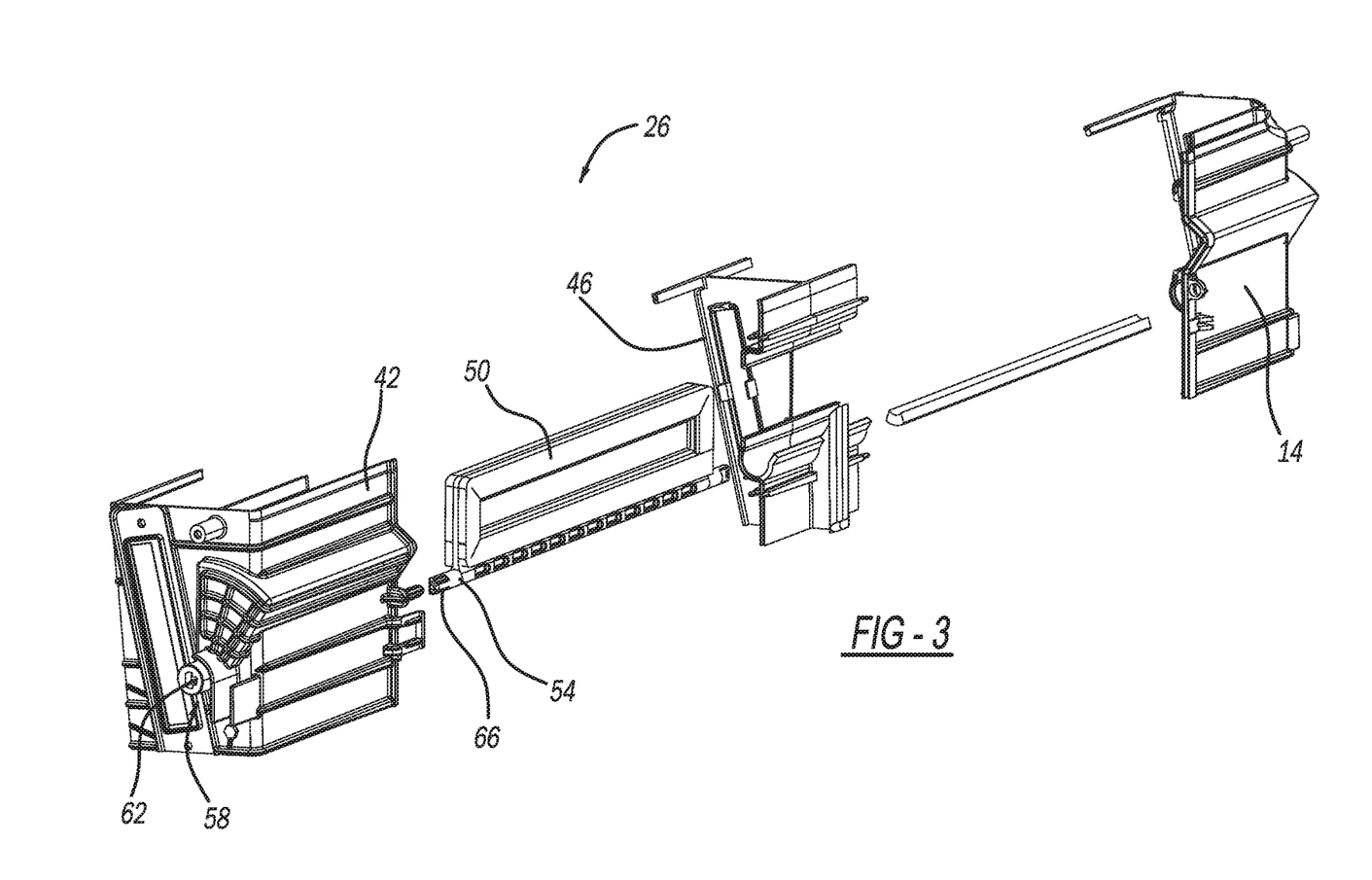
FIG. 3 is an exploded view of the portion of housing in FIG. 2.

The housing portion 26 in FIG. 2 is designed to mix and carry air from the evaporator 18 and heater core 22 disposed in a front portion of the vehicle to rear passenger outlets. The housing portion 26 may be disposed in a door of the vehicle and controls mixing for the rear-control mode of the HVAC system 10 while allowing free movement of the vehicle door.

Figure 4:
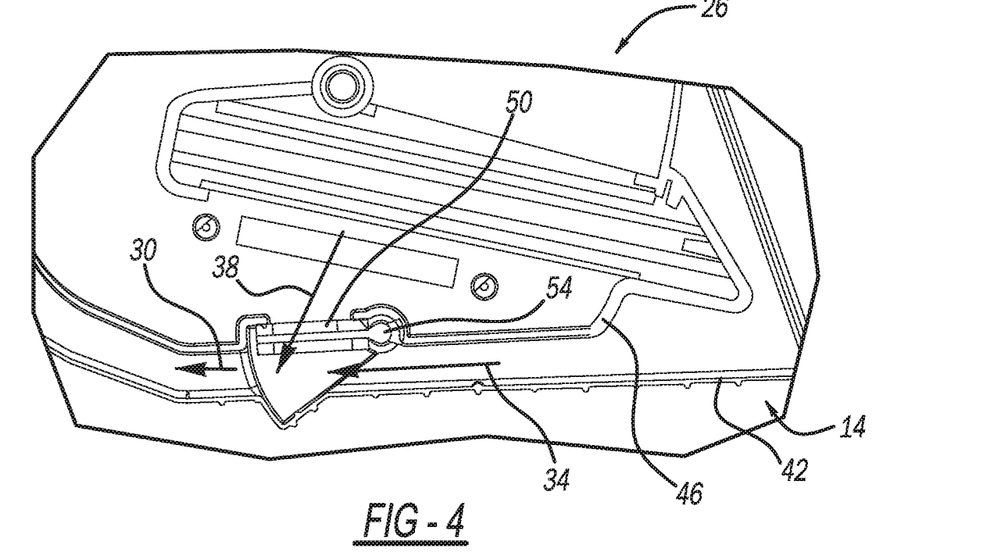
FIG. 4 is a cross sectional view of the housing in FIG. 2.

Referring additionally to FIG. 4, the housing portion 26 includes a rear air flow path 30, a cold air flow path 34, and a hot air flow path 38 defined by outer walls 42 and inner walls 46 of the housing 14. The cold air flow path 34 may extend from the evaporator 18 to the rear air flow path 30, and the hot air flow path 38 may extend from the heater core 22 to the rear air flow path 30.

A rear air mix door 50 may control mixing of air from the cold air flow path 34 and air from the hot air flow path 38 as set by the rear controls. The rear air mix door 50 may be rotationally positioned at an intersection of the rear air flow path 30, cold air flow path 34, and hot air flow path 38. The rear air mix door 50 may be fixed on a shaft 54 that is received in the outer walls 42 and/or inner walls 46 of the housing portion 26 of the HVAC system 10.

In vehicles having rear-control mode, the rear air mix door 50 may move between, and be fixed at any point between, a first position completely blocking air flow from the cold air flow path 34 and a second position completely blocking air flow from the hot air flow path 38. When the rear air mix door 50 is fixed in the first position, air from the hot air flow path 38, and heater core 22, heats a rear compartment of the vehicle through the rear air flow path 30 and rear passenger outlets. When the rear air mix door 50 is fixed in the second position, air from the cold air flow path 34, and evaporator 18, cools the rear compartment through the rear air flow path 30 and rear passenger outlets. When the rear air mix door 50 is fixed in any position between the first position and the second position, the air from the cold air flow path 34 mixes with the air from the hot air flow path 38 to create mixed air that is transported to the rear passenger outlets through the rear air flow path 30.

In some circumstances, such as when the vehicle does not have rear-control mode of the HVAC system 10, it is necessary to block the hot air flow path 38, only allowing air flow from the cold air flow path 34. To block the hot air flow path 38, the rear air mix door 50 may be locked in the second position.

Now referring to FIGS. 4-11, the housing portion 26 may include a lock 58 to immovably fix the rear air mix door 50 in the second position. For example, the lock 58 may include a female T-cut aperture 62 (FIGS. 5 and 6) in the outer wall 42 of the housing portion 26 that engages with a male T-cut 66 (FIG. 8) on the shaft 54 of the rear air mix door 50.

Figure 5:
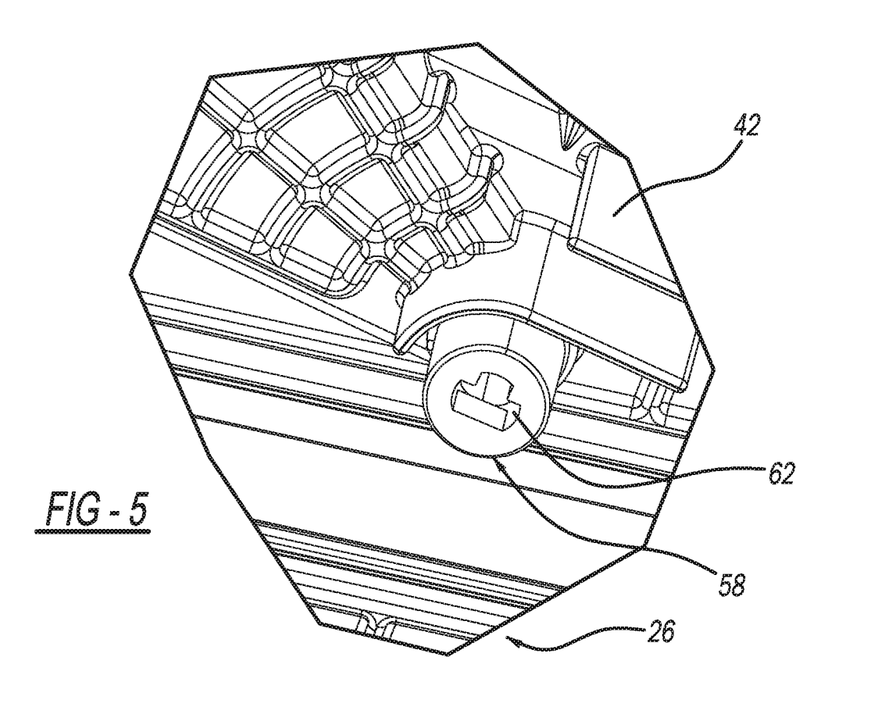
FIG. 5 is a detailed view of an exterior of an example lock in the housing in FIG. 2.
Figure 6:
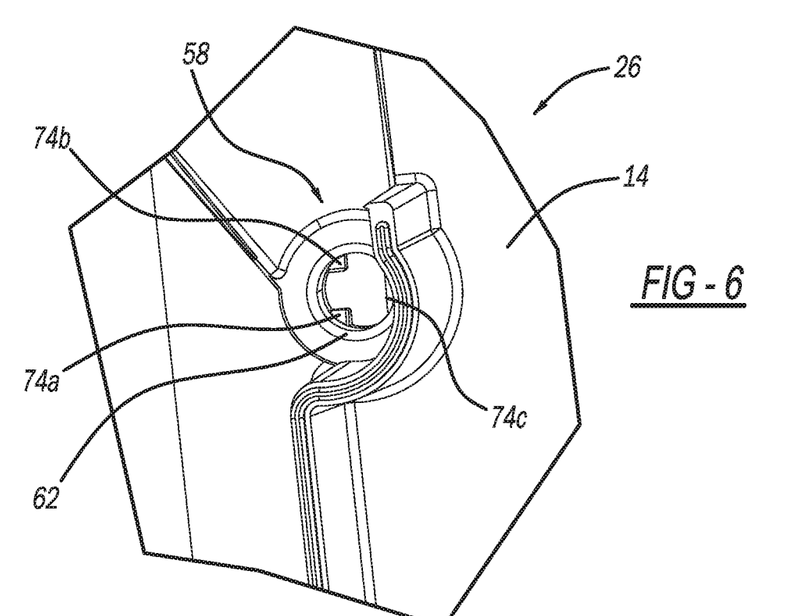
FIG. 6 is a detailed view of an interior of the example lock of FIG. 5.
Figure 7:
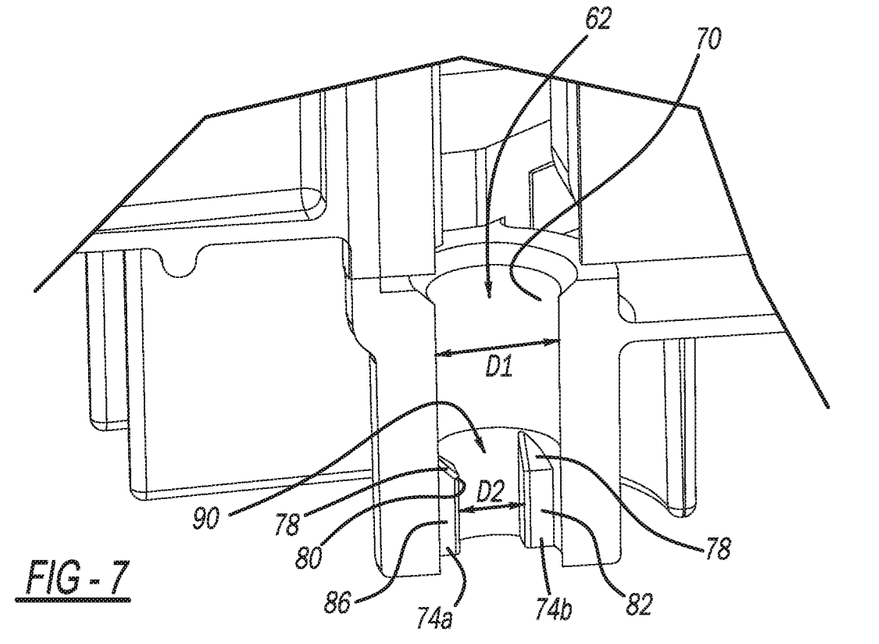
FIG. 7 is a cross sectional view of the example lock of FIG. 5.

As shown best in FIGS. 5-7, the outer wall 42 of the housing portion 26 includes the aperture 62 for receiving the shaft 54 of the rear air mix door 50. The aperture 62 further includes a T-shaped cross section (FIGS. 5 and 6) having an inner wall 70 with at least one chamfered step 74. In an example embodiment, the inner wall 70 may include three chamfered steps 74a, 74b, 74c (FIGS. 6, 7, 9, and 10) defining the T-shaped cross section. While three chamfered steps 74a, 74b, and 74c are illustrated, it is understood that any number of steps may be used to define the cross-sectional shape of the shaft 54 and align the shaft 54 in the aperture 62. The chamfered steps 74a, 74b, 74c may be rotationally, or circularly, positioned within the inner wall 70, such that the spaces within the aperture 62 not having the chamfered steps 74a, 74b, 74c define the three points of the T-shape. In a plan view (also seen in FIG. 6), the steps 74a and 74b may have a triangular shape (and more specifically a right triangular shape) with a curved hypotenuse, and the step 74c may have an elongate shape defined by a segment of the circular cross-sectional shape of the aperture 62 and with boundaries including the inner wall 70 and a chord of the circular cross-sectional shape of the aperture 62.

Each of the chamfered steps 74a, 74b, 74c includes a sloped edge 78 that extends from the inner wall 70 of the aperture 62 to an inner edge 80 of the chamfered step 74a, 74b, 74c. The sloped edge 78 may extend at a predetermined angle (for example only, 45°) relative to an insertion direction of the shaft 54 and may be a constant slope for each step 74a, 74b, 74c.

Figure 9:
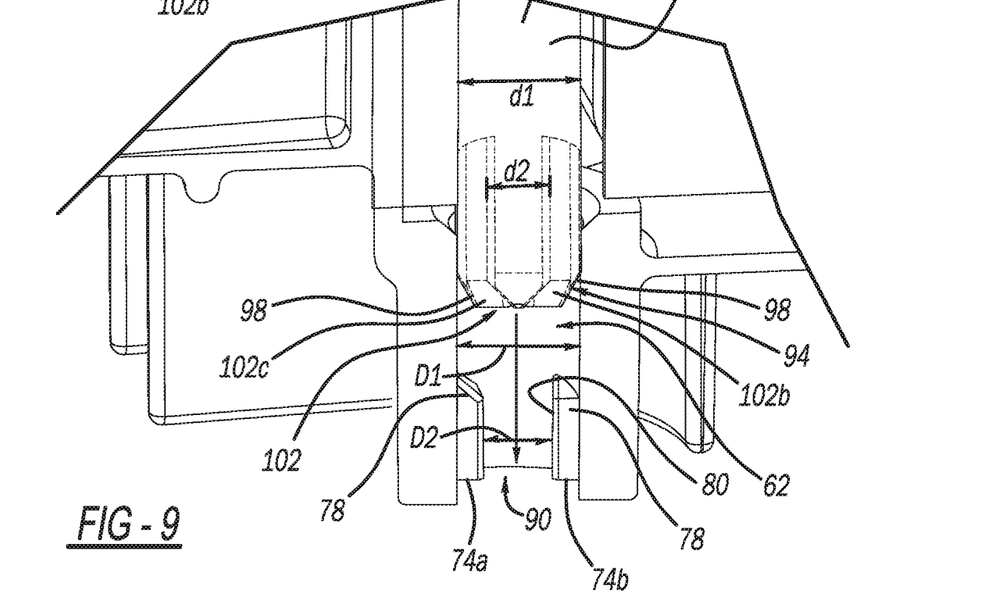
FIG. 9 is a detailed view of the door shaft of FIG. 8 being inserted into the lock of FIG. 5.

The chamfered steps 74a, 74b, 74c align the shaft 54 within the aperture 62 such that the rear air mix door 50 blocks the hot air flow path 38. As illustrated in FIGS. 7 and 9, the chamfered steps may be sloped in different directions to assist rotation and alignment of the shaft 54. For example, the step 74a is sloped in a direction away from the cross-sectional cut and the step 74b is sloped in a direction toward the cross-sectional cut. The different slopes assist the shaft 54 in turning clockwise within the aperture 62.

The chamfered steps 74a and 74b define a space 90 for receiving a leg 102a of the T-shaped shaft 54. A width D2 of the space 90 may be smaller than a diameter D1 of the aperture 62. For example only, the diameter D1 of the aperture 62 may be approximately 10 millimeters (mm), while the width D2 of the space 90 may be approximately 4 mm.

Figure 8:
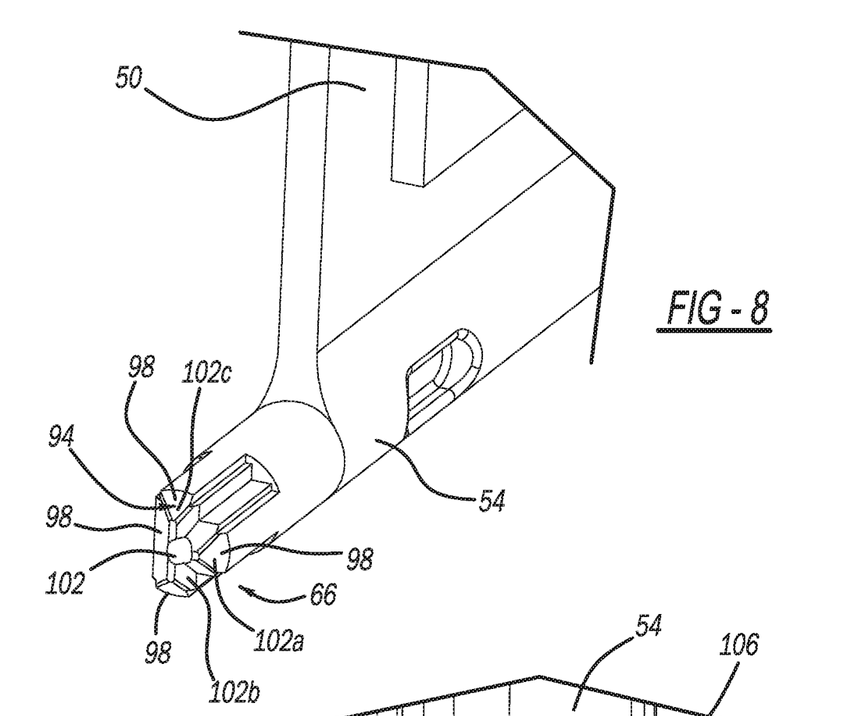
FIG. 8 is a detailed view of a door shaft supported by the housing in FIG. 2.
Figure 10:
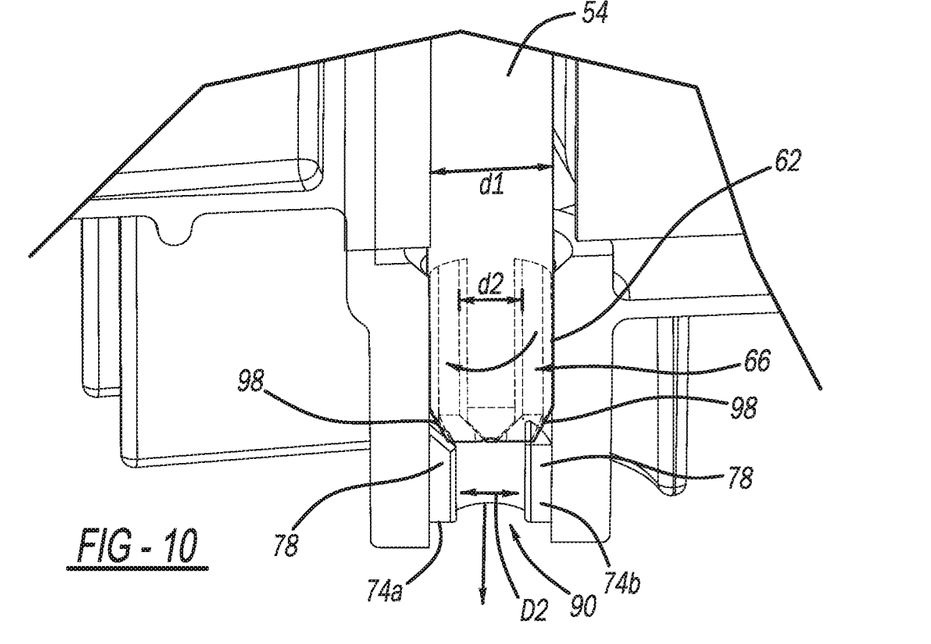
FIG. 10 is another detailed view of the door shaft of FIG. 8 being inserted into the lock of FIG. 5.

Referring now to FIGS. 8-10, the shaft 54 may be a male T-cut shaft that engages the female T-cut aperture 62 in the housing portion 26 (FIGS. 9 and 10). The shaft 54 may include a T-shaped cross-section having a first leg 102a, a second leg 102b, and a third leg 102c, each having at least one chamfered step 94 that engages the at least one chamfered step 74 of the aperture 62. While the shaft 54 is illustrated and described as having a T-shaped cross-section, it is understood that the shaft 54 could have any shaped cross-section (other than circular) that would lock movement of the shaft 54 relative to the aperture 62. In an example embodiment, the shaft 54 may include chamfered steps 94 to engage the three chamfered steps 74a, 74b, 74c in the aperture 62. The chamfered steps 94 may extend around a circumference of the shaft 54 and may each include a sloped edge 98. The sloped edge 98 may extend at a predetermined angle (for example only, at a 45° angle) to engage with the sloped edge 78 of the chamfered steps 74a, 74b, 74c in the female T-cut aperture 62.

When inserted, the leg 102a of the shaft 54 engages with the chamfered steps 74a and 74b of the aperture 62, the leg 102b engages with the chamfered steps 74a and 74c of the aperture 62, and the leg 102c engages with the chamfered steps 74b and 74c of the aperture 62. The sloped edge 78 of the chamfered step 74c engages with the sloped edge 98 of legs 102b and 102c across the top of the T-shaped shaft 54.

The leg 102a of the shaft 54 has a width d2 that is smaller than a diameter d1 of a base 106 of the shaft 54. Further, the width d2 and diameter d1 may be similar to, and slightly less than the width D2 and diameter D1, respectively. For example only, the diameter d1 of the base 106 may be less than 0.1 mm smaller than the diameter D1, and more particularly may be within a range of 9.90 mm to 9.99 mm, while the width d2 of the leg 102a may be less than 0.1 mm smaller than the width D2, and more particularly may be within a range of 3.90 mm to 3.99 mm. Thus, the diameter d1 may be sized such that the base 106 fits within the aperture 62 but not within the space 90, and the width d2 may be sized such that the leg 102a fits within both the aperture 62 and the space 90.

Figure 11:
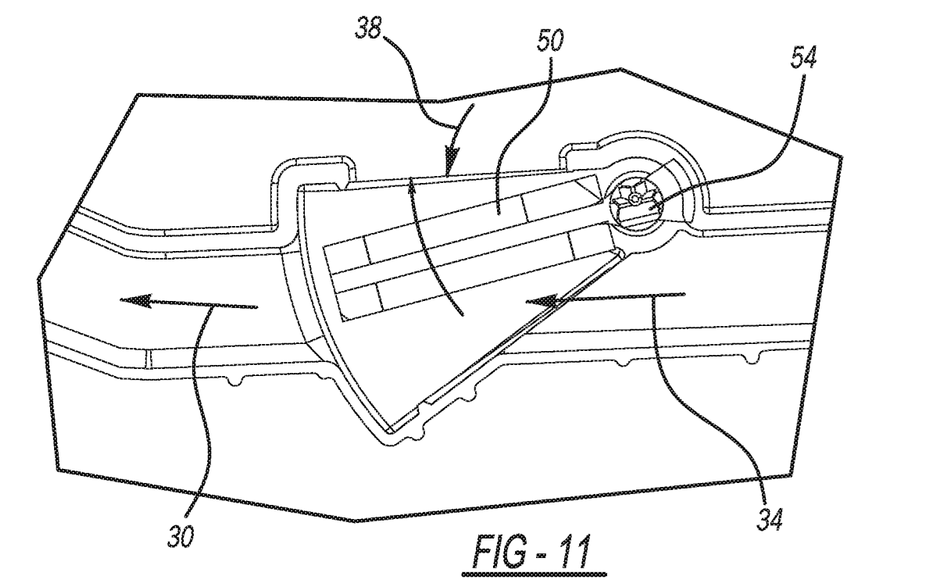
FIG. 11 is a detailed view of a rotational path of a door as the door shaft of FIG. 8 is inserted into the lock of FIG. 5.

As shown in FIGS. 9 and 10, the shaft 54 and aperture 62 engage such that the shaft 54 on the rear air mix door 50 slides into the aperture 62. During assembly of the housing portion 26, the shaft 54 is inserted into the aperture 62. As the shaft 54 engages the chamfered steps 74a, 74b, 74c on the inner wall 70 of the aperture 62, the shaft 54 twists, or rotates, rotating the rear air mix door 50 into the second position and blocking air flow from the hot air flow path 38. The rotation path of the rear air mix door 50 is illustrated in FIG. 11. Once the leg 102a aligns with the space 90, the leg 102a received within, or is inserted into, the space 90, locking the rear air mix door 50 into the second position. The automatic mechanical rotation of the shaft 54 (and rear air mix door 50) as the shaft 54 is inserted into the aperture 62 removes risk or need for an assembler to position (rotate) the rear air mix door 50 within the aperture 62 manually to block air flow from the hot air flow path 38 and lock the rear air mix door 50 in place. Thus the aperture 62 forces the rear air mix door 50 to seal over the hot air flow path 38 without additional installation, saving time and cost and easing assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air-conditioning system for a vehicle comprising:
   a housing including a first air flow path and a second air flow path;
   a door supported by the housing and moving between a first position blocking airflow from the first air flow path and a second position blocking airflow from the second air flow path; and
   a lock monolithically formed with the housing and configured to automatically lock the door in the second position upon assembly of the housing.

2. The heating, ventilation, and air-conditioning system of claim 1, wherein the door is fixed on a shaft for rotation within the housing, and the lock includes an aperture for receiving the shaft and rotationally fixing the shaft within the aperture.

3. The heating, ventilation, and air-conditioning system of claim 2, wherein the aperture is a T-shaped aperture and the shaft is a T-shaped shaft.

4. The heating, ventilation, and air-conditioning system of claim 2, wherein an inner wall of the aperture includes a chamfered step that engages a chamfered step of the shaft.

5. The heating, ventilation, and air-conditioning system of claim 4, wherein the chamfered step on the inner wall of the aperture includes a sloped edge.

6. The heating, ventilation, and air-conditioning system of claim 5, wherein an angle of the sloped edge relative to an insertion direction of the shaft is 45 degrees.

7. The heating, ventilation, and air-conditioning system of claim 2, wherein the inner wall of the aperture includes a first chamfered step, a second chamfered step, and a third chamfered step to define a T-shape of the aperture.

8. The heating, ventilation, and air-conditioning system of claim 7, wherein each of the first chamfered step, the second chamfered step, and the third chamfered step includes a sloped edge.

9. The heating, ventilation, and air-conditioning system of claim 8, wherein an angle of the sloped edge for each of the first chamfered step, the second chamfered step, and the third chamfered step relative to an insertion direction of the shaft is 45 degrees.

10. The heating, ventilation, and air-conditioning system of claim 4, wherein upon insertion of the shaft into the aperture, the engagement of the chamfered step of the shaft with the chamfered step of the inner wall rotates the shaft to position and retains the door in the second position.

11. The heating, ventilation, and air-conditioning system of claim 1, wherein the first air flow path is a cold air flow path and the second air flow path is a hot air flow path.

12. A housing for a heating, ventilation, and air-conditioning system comprising:
   sidewalls defining a first air flow path and a second air flow path;
   a door supported by the sidewalls and moving between a first position blocking airflow from the first air flow path and a second position blocking airflow from the second air flow path; and
   a lock monolithically formed with at least one of the sidewalls and configured to automatically lock the door in the second position upon assembly of the housing.

13. The housing of claim 12, wherein the door is fixed on a shaft for rotation relative to the sidewalls, and the lock includes an aperture for receiving the shaft and rotationally fixing the shaft within the aperture.

14. The housing of claim 13, wherein the aperture is a T-shaped aperture and the shaft is a T-shaped shaft.

15. The housing of claim 13, wherein an inner wall of the aperture includes a chamfered step that engages a chamfered step of the shaft.

16. The housing of claim 15, wherein the chamfered step on the inner wall of the aperture includes a sloped edge.

17. The housing of claim 13, wherein an inner wall of the aperture includes a first chamfered step, a second chamfered step, and a third chamfered step to define a T-shape of the aperture.

18. The housing of claim 16, wherein each of the first chamfered step, the second chamfered step, and the third chamfered step includes a sloped edge.

19. The housing of claim 15, wherein upon insertion of the shaft into the aperture, the engagement of the chamfered step of the shaft with the chamfered step of the inner wall rotates the shaft to position and retains the door in the second position.

20. The housing of claim 12, wherein the first air flow path is a cold air flow path and the second air flow path is a hot air flow path.

* * * * *